United States Patent [19]

Wilson et al.

[11] 4,314,129

[45] Feb. 2, 1982

[54] METHOD AND APPARATUS FOR MAKING WELL SCREEN

[75] Inventors: Hill D. Wilson; Norman R. Corgey, both of Houston, Tex.

[73] Assignee: Houston Well Screen Company, Houston, Tex.

[21] Appl. No.: 11,035

[22] Filed: Feb. 12, 1979

[51] Int. Cl.³ ............................................. B23K 11/00
[52] U.S. Cl. .............................. 219/58; 29/163.5 CW; 140/112; 219/56
[58] Field of Search .................................. 219/56–58, 219/81; 140/112; 29/163.5 CW

[56] References Cited

U.S. PATENT DOCUMENTS

| | | | |
|---|---|---|---|
| 2,312,458 | 3/1943 | Williams. | |
| 2,327,637 | 8/1943 | Williams. | |
| 2,327,686 | 8/1943 | Williams. | |
| 2,473,859 | 6/1949 | Butler | 219/58 X |
| 2,965,744 | 12/1960 | Busse | 219/81 X |
| 3,469,609 | 9/1969 | Smith | 219/56 |
| 3,785,409 | 1/1974 | Smith | 219/56 X |
| 3,920,170 | 11/1975 | Colburn | 219/56 X |

FOREIGN PATENT DOCUMENTS

| | | |
|---|---|---|
| 302662 | 3/1930 | United Kingdom. |
| 380564 | 9/1932 | United Kingdom. |
| 400790 | 11/1933 | United Kingdom. |
| 525485 | 8/1940 | United Kingdom. |

Primary Examiner—Elliot A. Goldberg
Attorney, Agent, or Firm—Jennings B. Thompson; Marvin B. Eickenroht

[57] ABSTRACT

A rod-based well screen is formed in place on a perforated pipe base by wrapping wire around the pipe base and a plurality of rods located around the outside of the pipe. The wire is welded sequentially to each individual rod as it is wrapped around the pipe. The welding and ground electrodes engage the wire and the rods respectively. The rod engaging ground electrode is positioned a short distance ahead of the wire being wrapped around the rods and the pipe base. The ground electrode includes a plurality of contacts. Each contact is mounted to pivot toward and away from a rod. Springs urge each contact toward a rod to hold the rod against the outside surface of the pipe base and to maintain good electrical contact between the contact and the rod. Each contact has a groove to guide the rod into position for welding to the wire.

7 Claims, 3 Drawing Figures

METHOD AND APPARATUS FOR MAKING WELL SCREEN

This invention relates to well screens generally, and, in particular, to welded rod-based screen with a pipe base.

Welded rod-based screen, sometimes referred to as "bar-weld" screen, is formed by wrapping wire in spaced helical coils around a plurality of rods. The rods are parallel to each other and equally spaced around a circular path of predetermined diameter. The conventional way of making this screen is to move the rods longitudinally past stationary wire feeding apparatus and welding electrodes. The rods are rotated as well as moved longitudinally to wrap the wire around the rods in spaced helical coils. The welding electrode engages the wire as it contacts each rod and welds the wire to the rods, sequentially. The welding current travels from the welding electrode to the wire and into the rod then from the rod to a ground electrode positioned internally of the rods. The tension in the wire that is needed to cause the wire to wrap around the rods acts to hold the rods in good electrical contact with the internal ground electrode. See U.S. Pat. No. 3,275,785, entitled "Method and Apparatus for Manufacturing Well Screens", which issued to Hill D. Wilson on Sept. 27, 1966.

The screen thus formed is either used with or without a pipe base. If a pipe base is desired, the welded rod-based screen is slipped over the perforated pipe and its ends are welded to the pipe. To slip the screen over the pipe base, there must be clearance between the screen and the pipe. Differential pressure usually exists across the screen when in service. This pressure, if sufficient, will cause the wires and the rods to be bent inwardly into contact with the pipe base. Such a collapse will result in a shifting of the coils of wire forming the screen and reduce or destroy the ability of the screen to serve its intended purpose.

Apparatus for making a rod-based screen in place on a perforated pipe base is disclosed in U.S. Pat. No. 3,469,609, which issued Sept. 30, 1969 to Howard L. Smith, III. In this patent it is proposed to wrap the wire directly on the rods lying along the outside of the perforated pipe base. One disc shaped electrode contacts the wire as it engages the rods to weld the wire to the rods as it is being wrapped around the rods and the pipe base. A second electrode, which is also disc shaped, rolls along the coils that have already been welded to the rods to provide a ground for the welding circuit. In this arrangement, the electrical current flows through the wire being welded into the rod directly below it then along the rod to the portion of the previously wrapped wire that is in contact with the ground electrode then through this portion of the wire into the ground electrode. At the same time, the current can flow directly to the ground electrode through the wire. The amount of current taking this path will depend on the resistance of the wire alone as opposed to the resistance of the circuit through the wire to the rods and back to the wire. Unless there is sufficient resistance and current at the point of contact between the wire and rod to heat the metal to fusion temperature then no weld will occur. This necessary high resistance will tend to cause the current to flow to ground through the wire.

The arrangement described in this patent may have another disadvantage. It may be difficult to maintain good electrical contact between the rolling ground electrode and the wire already wrapped and welded to the rods on the pipe base. It is very important that the portion of the circuit from the rod to ground have a substantially lower resistance to the flow of current than the resistance provided between the rod and the wire that is being welded to it.

In other words, to get a good fusion weld between the rod and the wire the principal resistance in the circuit should occur at that point in order to heat the rod and wire sufficiently to obtain fusion between the two. This means that between the rod and ground there must be a minimum of resistance in the circuit. This requires a very good low resistance contact between the ground electrode and the portion of the screen that it contacts, which may be difficult to obtain with the rolling ground electrode described in the Smith Patent.

Therefore, it is an object of this invention to provide an improved method of and apparatus for forming a welded rod-base screen in place on a perforated pipe base.

A further object of this invention is to provide such method and apparatus that employs a ground electrode that directly contacts the rods positioned on the pipe base ahead of the wire being wrapped on the rods to provide a minimum of electrical resistance between the point of the weld and ground.

It is another object of this invention to provide such method and apparatus that serves to pull the rods into firm contact with the pipe base as the wire is wrapped around the rods and pipe base so there will be no clearance between the rods and the pipe base. Thus, the wire is pulled tightly around the rods which are firmly supported by the pipe base and is firmly supported against the differential pressure that may develop across the screen in service.

These and other objects, advantages and features of this invention will be apparent to those skilled in the art from a consideration of this specification including the attached drawings and appended claims.

Pipe base 10 is provided with a plurality of perforations 11. A plurality of rods 12 extend along the outside surface of the pipe base, generally parallel to its longitudinal axis. The rods are usually equally spaced around the outside of the pipe base. Wire 14 is shown being wrapped around the pipe base and rods to form a screen. The wire feeding means is not shown but is of conventional construction usually comprising a drum from which the wire is fed. Usually, some sort of braking arrangement is used to hold the wire in tension to cause it to bend around the pipe and the rods. For examples of wire feeding means, see the above identified Smith and Wilson Patents.

To wrap the wire on the pipe and rods, relative rotation between the pipe and rods and the wire feeding means is necessary. Usually, the wire feeding means is fixed and the pipe and rods are rotated. At the same time the pipe and rods are moved longitudinally at a speed which along with the speed of rotation provides the desired spacing between the adjacent coils of wire. Alternatively, as shown in the Smith Patent, the wire feeding means can be moved longitudinally of the pipe and rods while the pipe and rods are rotated.

In accordance with this invention first electrode 16 is positioned to engage the wire as it is wrapped on the pipe and provide a welding current that causes the wire and the rod it engages to fuse together. The electrode is disc-shaped and rolls along the wire. To complete the circuit, means are provided to connect the rods to ground a short distance ahead of the wrapped wire.

Figure 1:
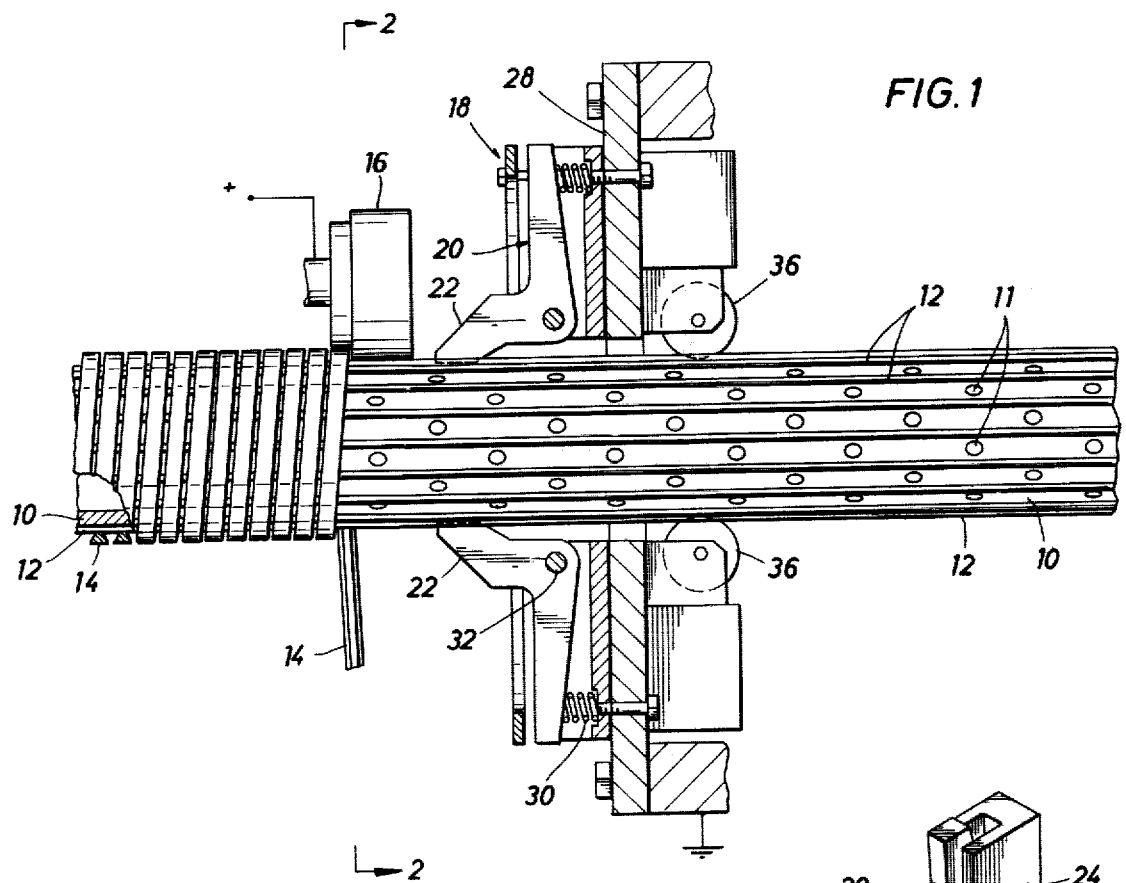
FIG. 1 is a view partly in elevation and partly in section of the preferred embodiment of the welding and ground electrodes in position in accordance with this invention forming a welded rod-based screen in place on a pipe base.
Figure 3:
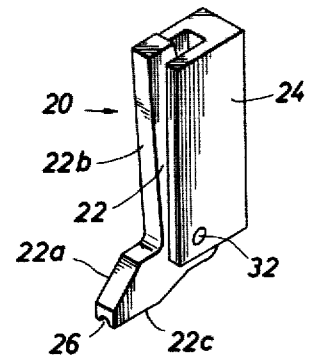
FIG. 3 is an isometric view of one of the contact assemblies of the ground electrode.
Figure 2:
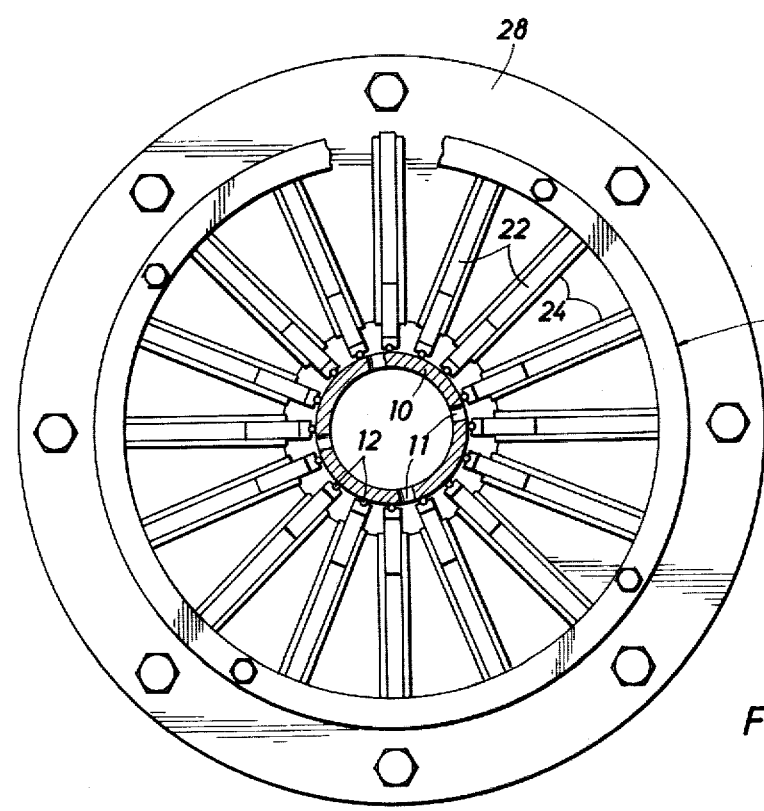
FIG. 2 is a cross sectional view taken along line 2—2 of FIG. 1.

In the embodiment shown in FIG. 1, such means comprise second or ground electrode 18. The ground electrode includes a plurality of contact assemblies 20. Each assembly includes contact 22 and contact housing 24, as shown in FIG. 3. The contact is generally L-shaped having leg 22a which extends outwardly from housing 24 and leg 22b, which is generally located within U shaped housing 24, leg 22a has elongated contact surface 22c for engaging one of the rods that extends along the surface of the pipe base. Preferably, contact surface 22c is provided with groove 26 extending parallel to the rod to receive the rod and to guide the rod as it moves from under the contact to a position under the wire and the welding electrode. Each individual contact assembly is attached to plate 28 as shown in FIGS. 1 and 2 along a line extending radially from the center of the pipe base. Each contact engages one of the rods located on the outside of the pipe base.

Means are provided to resiliently urge the contact surface of each contact toward the rod it engages to hold the rod in contact with the pipe base. In the embodiment shown, coil spring 30 is positioned between the back of U-shaped housing 24 and engages leg 22b adjacent its upper end. The spring urges the contact to pivot around pin 32, which mounts the contact in the housing. This in turn urges contact surface 22c of the contact into firm engagement with the rod it engages and, in turn, holds the rod in groove 26 and against the outside surface of pipe base 10. As the pipe and rods are rotated, the rods tend to move and flop around. So the contacts through the resilient force of springs 30 and grooves 26 also serve to hold the rods from lateral movement and guide the rods as they move under the wire and welding electrode 16 so that they will have the proper spacing under the wire.

Electrode 18 including contacts 22 should be made of a material having good electrical conductivity, such as brass. This reduces the tendency for any welding to occur between the contacts and the rods. The rods are generally of steel, often stainless steel. Housing 24 for the rod assembly as well as mounting plate 28 should also be made of a material having good electrical conductivity. The ground electrode assembly is mounted on rotating head 31 for rotation with the pipe and the rods. A commutator or the like (not shown) connects the electrode to ground.

As explained above the best welds are obtained between the wire and the rod by providing an electrical welding circuit wherein the major resistance in the circuit is the contact between the wire and the rod to which it is to be welded. The circuit between there and ground should be substantially lower in resistance. Therefore, preferably ground electrode 18 is positioned so that contact surface 22c on each individual contact 22 is positioned as close to the welding electrode as possible to reduce the distance the electrical current has to flow down the rod to the ground contact. Also, the contacts can do a better job of guiding the rods, the closer the contacts are to the point of welding the wire to the rods. Preferably, the contacts are spaced less than one inch (2.54 cm) from the welding electrode.

Mounted on the back of plate 28 of the ground electrode are means for engaging the outside surface of the pipe to hold the contacts of the ground electrode equally spaced from the longitudinal axis of the pipe. In the embodiment shown, four wheels 36 are positioned at 90° angles from each other to extend between the rods and engage the surface of the pipe base. These wheels serve to hold the individual contacts of the ground electrode equally spaced from the pipe, i.e. the electrode is centered relative to the pipe base.

Thus in operation and in the practice of the method of this invention to make a rod-based screen in place on a perforated pipe base, the pipe is mounted for rotation around its longitudinal axis. A plurality of rods are positioned along the outer surface of the pipe. By rotating the pipe and the rods, a wire is wrapped in spaced helical coils around the pipe. The wire is welded to the rods as the wire engages the rods. The welding circuit is grounded to the rods ahead of the wrapped wire through contacts that engage the rods on the outside surface of the rods adjacent to the point of weld.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of making a rod-based screen in place on a perforated pipe base comprising the steps of mounting a perforated pipe for rotation around its longitudinal axis positioning a plurality of rods along the outer surface of the pipe rotating the pipe and the rods to wrap a wire in spaced helical coils around the pipe and the rods, welding the wire to the rods as the wire engages the rods, and grounding each individual rod ahead of the wrapped wire through a separate individual contact that engages only said individual rod on the outside surface of the rod adjacent the wire.

2. Apparatus for making a rod-based wire screen in place on a perforated pipe base comprising means for mounting a perforated pipe for rotation around its longitudinal axis having a plurality of individual rods extending along and spaced around the outside surface of the pipe for rotation therewith, a wire feeding means, means for causing relative rotation between the pipe and the wire feeding means to wrap the wire around the outside of the pipe and the rods, means for causing relative movement longitudinally of the pipe between the pipe and rods and the wire feeding means to wrap the wire around the pipe and rods in spaced helical coils, a first electrode positioned to engage the wire and weld the wire to each individual rod as the wire is wrapped around the rods, a plurality of second electrodes, means mounting the second electrodes for each second electrode to engage only one individual rod a short distance ahead of the wire as the wire is wrapped around the pipe and rods and resilient means urging each electrode toward the individual rod it engages to hold the electrode in good electrical contact with the rod at all times to provide a separate welding circuit between the first electrode through the wire and the individual rod to which it is being welded and the second electrode in electrical contact with the rod.

3. Apparatus for making a rod-based wire screen in place on a perforated pipe base comprising means for mounting a perforated pipe for rotation around its longitudinal axis having a plurality of rods extending along the outside surface of the pipe for rotation therewith, a wire feeding means, means for causing relative rotation between the pipe and the wire feeding means to wrap the wire around the outside of the pipe and the rods, means for causing relative movement longitudinally of the pipe between the pipe and rods and the wire feeding means to wrap the wire around the pipe and rods in spaced helical coils, a first electrode positioned to engage the wire and weld the wire to each rod as the wire is wrapped around the rods, a second electrode having a plurality of separate individual contacts with each individual contact engaging only one of the rods, and means mounting the second electrode for each individual contact to engage the rod that it engages a short distance ahead of the wire as the wire is wrapped around the pipe and rods to provide an electrical circuit between the first and second electrodes as the wire engages each rod to weld the wire to the rods.

4. The apparatus of claim 3 in which the second electrode includes means mounting each individual contact for movement toward and away from the rod it contacts and separate resilient means associated with each individual contact urging each individual contact toward the rod it engages to resiliently hold each individual contact in engagement with the rod and the rod in engagement with the outside surface of the pipe independently of the position of the other individual contacts.

5. The apparatus of claim 4 in which each individual contact includes a surface for contacting the rod it engages and a groove in the surface extending parallel to the longitudinal axis of the pipe to receive the rod and hold the rod in a predetermined spaced relationship to the other rods as the rod moves relative to the contact toward the wire.

6. The apparatus of claim 4 in which the second electrode is further provided with means carried by the second electrode and extending radially toward the central axis between selected pairs of rods for engaging the outside surface of the pipe to hold the second electrode equally spaced from the pipe.

7. The apparatus of claim 3 in which each individual contact of the second electrode comprises a contact assembly having an L-shaped contact member and a U-shaped housing both of electrically conductive material, said L-shaped contact having a first leg located in the U-shaped housing in sliding electrical contact therewith, a second leg extending outwardly of the housing having a contact surface in sliding electrical contact with one of the rods extending along the outside surface of the pipe, a pivot pin extending through the housing and the L-shaped contact member, and resilient means positioned between the first leg and the housing urging the contact member to pivot around the pivot pin and hold the contact surface on the second leg of the contact member in engagement with the rod.

* * * * *